United States Patent [19]

Sbalchiero et al.

[11] Patent Number: 4,747,208

[45] Date of Patent: * May 31, 1988

[54] DEVICE FOR ASSEMBLING RETURN BEND TO COIL

[75] Inventors: Carlo Sbalchiero, Fagagna; Brazzale Giorgio, Creazzo, both of Italy

[73] Assignee: Burr Oak Tool & Gauge Co., Sturgis, Mich.

[*] Notice: The portion of the term of this patent subsequent to Aug. 4, 2004 has been disclaimed.

[21] Appl. No.: 38,255

[22] Filed: Apr. 14, 1987

Related U.S. Application Data

[63] Continuation of Ser. No. 618,972, Jun. 11, 1984, Pat. No. 4,683,649.

[51] Int. Cl.$^4$ .............................................. B23P 15/26
[52] U.S. Cl. .................................... 29/726; 29/281.4; 29/281.5; 29/714; 29/795
[58] Field of Search ................. 29/726, 714, 718, 809, 29/237, 272, 281.4, 790, 787, 795, 283, 281.5, 281.6; 414/224, 226; 29/822; 901/16, 14, 31, 32, 8, 7, 6, 17, 18

[56] References Cited

U.S. PATENT DOCUMENTS

| | | | |
|---|---|---|---|
| 3,279,045 | 10/1966 | Dixon | 29/822 X |
| 3,718,216 | 2/1973 | Wilson | 414/226 |
| 3,760,956 | 9/1973 | Burch | 901/7 X |
| 3,888,362 | 4/1976 | Mette | 901/17 X |
| 4,037,731 | 7/1977 | Reis et al. | 901/6 X |
| 4,458,401 | 7/1984 | Graham et al. | 29/718 X |
| 4,488,662 | 12/1984 | Fanning | 29/809 X |
| 4,538,956 | 9/1985 | Kalkbrenner et al. | 901/6 X |

FOREIGN PATENT DOCUMENTS

| | | | |
|---|---|---|---|
| 51660 | 4/1977 | Japan | 901/8 |
| 146435 | 9/1982 | Japan | 29/726 |
| 541664 | 3/1977 | U.S.S.R. | 901/14 |
| 917378 | 3/1982 | U.S.S.R. | 29/281.4 |

Primary Examiner—Howard N. Goldberg
Assistant Examiner—Joseph M. Gorski
Attorney, Agent, or Firm—Flynn, Thiel, Boutell & Tanis

[57] ABSTRACT

An assembly device for assembling a member having plural and spaced end segments thereon to a workpiece having plural and spaced sets of end segment receiving openings thereon, the spacing between the end segment receiving openings in each set corresponding to the spacing of the end segments from each other. The assembly device includes a frame on which is mounted a transport device for transporting the member from a supply thereof to a workpiece mounted on a workpiece holder. The member is oriented so that the end segments thereon are vertically aligned with the end segment receiving openings on the workpiece to facilitate an insertion of the end segments into the end segment receiving openings upon a movement of the transport structure into a working zone. Thereafter, the member is released by the transport mechanism to enable the transport mechanism to return back to its initial position thereof to await the receipt of a new member therein.

9 Claims, 9 Drawing Sheets

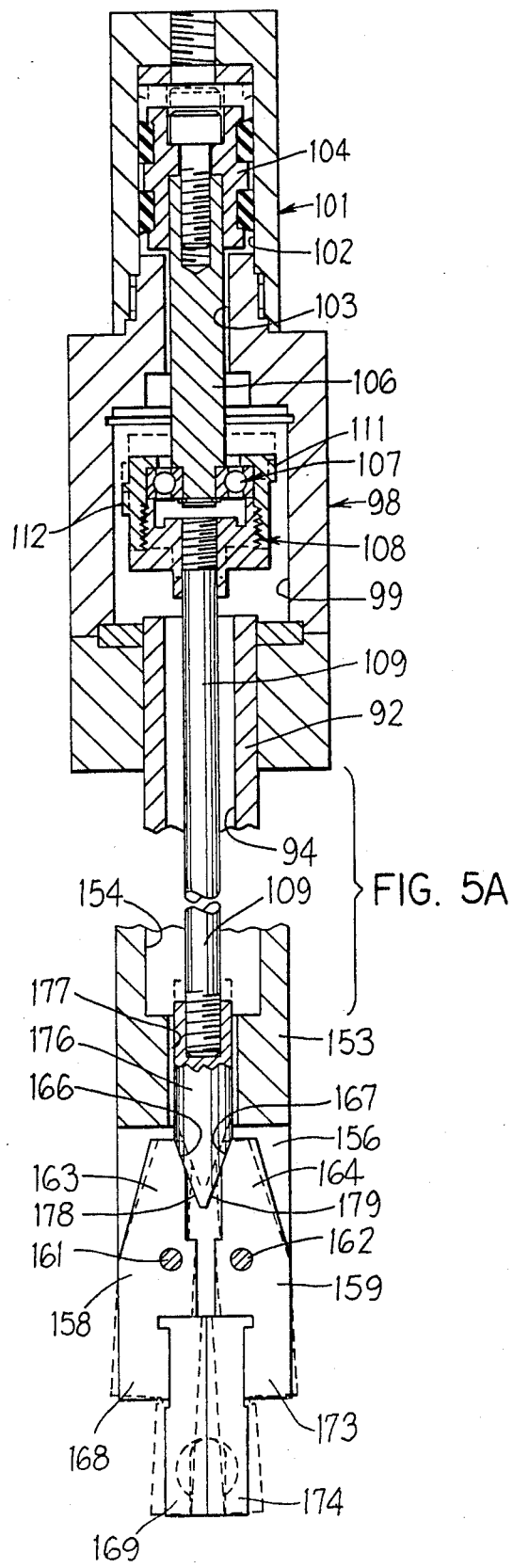

DEVICE FOR ASSEMBLING RETURN BEND TO COIL

This is a continuation of application Ser. No. 618,972, filed June 11, 1984, now U.S. Pat. No. 4,683,649.

FIELD OF THE INVENTION

This invention relates to an assembly device for assembling a member having plural and spaced end segments thereon to a workpiece having plural and spaced sets of end segment receiving structure thereon, the spacing between the end segment receiving structure in each set corresponding to the spacing of the end segments from each other.

BACKGROUND OF THE INVENTION

FIGS. 1 and 2 illustrate a conventional coil 10 having a pair of spaced tube sheet end plates 11 and 12. Plural fins 13 are oriented between the tube sheet end plates 11 and 12. Plural and axially aligned sets of holes are provided in each of the tube sheet end plates 11 and 12 and the fins 13 and are adapted to receive therein the legs 14 of U-shaped hairpin tubes 16. If desired, a tube expander can be utilized in expanding the diameter of the legs 14 of each of the hairpin tubes to effect a fixed securement of each hairpin tube to the respective tube sheet end plate 11, 12 and the plural fins 13 oriented therebetween. The open ends 19 of each of the hairpin tubes 16 can be in a staggered array as illustrated in FIG. 1 or an in-line pattern (not illustrated). The illustration in FIG. 2 is of the staggered pattern array. In this particular embodiment, the open end of the U-shaped hairpin tubes are each equally spaced from the mutually adjacent open ends of other U-shaped hairpin tubes.

Heretofore, assembly workers have been utilized in placing return bends (also known as "U" bends) 17 into selected ones of the open ends of the hairpin shaped tubes 16 in accordance with a particular work order. For example, the assembly worker might install the return bends 17 in the array illustrated in FIG. 2. This task would involve the assembly worker carefully aligning the end segments 18 of a particular return bend 17 with the open ends 19 of a hairpin tube 16 and taking a hammer and slightly tapping the return bend into place. While many assembly workers can work at a very rapid pace, pattern errors are sometimes made which necessitates a disassembly of the return bends 17 and a reassembly thereof in accordance with the correct pattern.

Accordingly, it is an object of the present invention to provide an assembly device enabling an automated assembly of the return bends to the open ends of the hairpin tubes incorporated into a coil construction to enable a reduction in the labor force required to perform the desired task.

It is a further object of the invention to provide an automated assembly device, as aforesaid, which is rapid in its operation and consistently performs the assembly task in the desired pattern. It is a further object of the invention to provide an assembly device, as aforesaid, utilizing only a single worker to place workpieces or coils having no return bends installed into a specific location thereon and then activate the assembly device to have all of the return bends automatically inserted in the desired pattern into the open ends of the hairpin tubes.

It is a further object of the invention to provide an assembly device, as aforesaid, which is durable in its construction and is capable of rapidly inserting return bends into the open ends of hairpin tubes of a coil construction in accordance with the desired pattern.

It is a further object of the invention to provide an assembly device, as aforesaid, which performs the task of the inserting of return bends into the appropriate ones of the open ends of the hairpin tubes without damaging the end segments of the return bends or the perimeter of the open ends of the hairpin tubes so that upon a soldering of the return bends to the hairpin tubes, leakage will be prevented.

SUMMARY OF THE INVENTION

The objects and purposes of the invention are met by providing an assembly device for assembling a member having plural and spaced end segments thereon to a workpiece having plural and spaced sets of end segment receiving openings thereon, the spacing between the end segment receiving openings in each set corresponding to the spacing of the end segments from each other. The assembly device includes a frame and a workpiece support mounted on the frame and movable in at least two perpendicularly related directions defining a plane to bring each set of end segment receiving openings into a working zone. A workpiece holder is provided and is adapted to hold the workpiece fixedly on the workpiece support and to assure movement of the workpiece with the workpiece support. A member supply mechanism is mounted on the frame as is a member transport structure for transporting a member from the supply mechanism to a workpiece mounted on the workpiece holder. The transport includes a gripping mechanism adapted to grip and hold the member in an initial first oriented position relative to a workpiece mounted on the workpiece holder. The gripping mechanism is then oriented about an axis of rotation perpendicular to the aforesaid plane and so that the plural and spaced end segments become aligned with the plural and spaced end segment receiving openings on the workpiece. The gripping mechanism also includes a drive for moving the gripping mechanism toward and away from the workpiece to move a member gripped thereby to the workpiece and effect an insertion of the end segments into the end segment receiving openings. A release mechanism is provided for releasing the holding relation between the gripping mechanism and a member in response to the gripping mechanism reaching the working position to thereby enable the gripping mechanism to move away from the workpiece without a member held therein and to enable the gripping mechanism to be reoriented to the initial position thereof. A drive mechanism is provided for effecting a movement of the workpiece support mechanism to bring a new set of open end segment receiving openings into the working zone.

BRIEF DESCRIPTION OF THE DRAWINGS

Other objects and purposes of this invention will be apparent to persons acquainted with apparatus of this general type upon reading the following specification and inspecting the accompanying drawings, in which:

FIG. 5A is an enlarged fragment of the illustration of FIG. 5;

DETAILED DESCRIPTION

Figure 3:
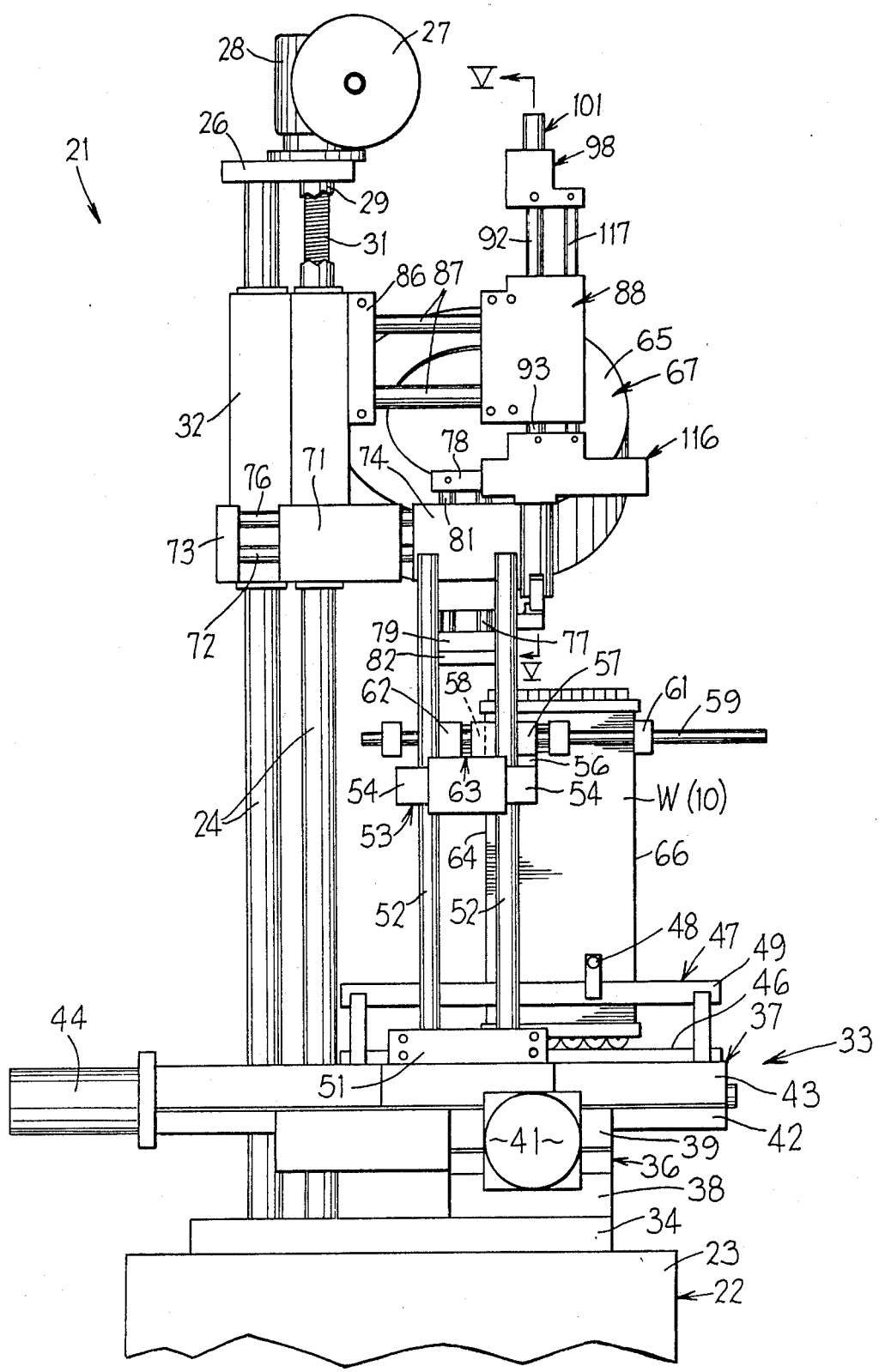
FIG. 3 is a side elevational view of an assembly device embodying the invention.

An assembly device 21 embodying the invention is illustrated in FIG. 3. The assembling device includes a frame 22 which is composed of a base 23 and a pair of upstanding post members 24 mounted on the base 23. A platform 26 is secured to the upper end of the post members 24 and supports an electric motor 27 and a gear reducing member 28 thereon. In this particular embodiment, the output shaft 29 of the gear reducing mechanism extends generally parallel to the longitudinal axis of the post members 24. An elongated screw member 31 is fixedly secured to the output shaft 29 and is journalled at the end remote from the gear reducing mechanism in bearing structure (not shown) provided in the base 23. A carriage 32 is slidably mounted on the post members 24 and contains a nut member (not shown) threadedly engaged with the screw member 31 so that the carriage 32 will move vertically lengthwise of the post members 24 in response to a driving rotation of the screw member 31 by the electric motor 27.

A workpiece support mechanism 33 is mounted on the base 23 and includes a base plate 34 and two right angle oriented movable table mechanisms 36 and 37. The movable table mechanism 36 includes a base member 38 fixedly secured to the base plate 34. The upper surface of the base member 38 has a track thereon with which cooperates a mating track on the lower surface of a movable member 39. Various drive arrangements can be provided for effecting a movement of the movable member 39 relative to the stationary base member 38. One such drive arrangement can include an electric motor 41 driving an elongated screw (not illustrated) extending parallel to the mating tracks on the base member 38 and movable member 39. The motor 41 is secured to the base member 38 and a nut (not illustrated) operatively engaged with the screw would be secured to the movable member 39. Thus, upon activation of the motor 41, the screw would be rotated and the nut would travel along the length of the screw to effect a movement of the movable member 39 relative to the base member 38. Similarly, the movable table mechanism 37 includes a base member 42 mounted on the movable member 39 of the movable table mechanism 36. The base member 42 has an elongated track structure thereon extending perpendicularly to the track structure between the mating base member 38 and movable member 39 of the movable table mechanism 36 and operatively engages a track on the undersurface of the movable member 43 of the movable table mechanism 37. An electric motor 44, mounted on the base member 42, can effect a drive of the movable member 43 relative to the base member 42 in the same manner as the electric motor 41 can effect the relative movement between the movable member 39 and base member 38 of the movable table mechanism 36. Since the track structure on the movable table mechanisms 36 and 37 are oriented at right angles to one another, the workpiece supporting surface 46 on the upper surface of the movable member 43 can be moved in the horizontal plane defined by an x-y coordinate system. For example, the electric motor 41 can effect variations of the workpiece supporting surface in the x direction and the electric motor 44 can effect variations in the workpiece supporting surface 46 in the y direction.

A bracket 47 is secured to the movable member 43 of the movable table mechanism 37 and has a metal detecting sensor 48 mounted thereon. In this particular embodiment, the bracket 47 includes an elongated bar 49 extending generally parallel to the longitudinal axis of the track mechanism on the movable table mechanism 37. The metal detecting sensor 48 is fixedly mounted on the bar 49. In the alternative, a manual switch (not shown) can be provided in addition to or in place of the sensor 48.

A side bracket 51 is secured to the movable member 43 of the movable table mechanism 37. A pair of upstanding post members 52 are mounted on the side bracket 51 and extend upwardly away therefrom in a direction generally parallel to the post members 24. A workpiece clamping mechanism 53 is fixedly secured to the post members 52 by clamps 54. A support plate 56 is mounted on the clamps 54 and supports a pneumatic cylinder assembly 57 thereon. An abutment plate 58 is secured to the pneumatic cylinder 57 on a side thereof remote from the post 52 and extends away therefrom. The purpose of this abutment plate 58 will be explained below. A reciprocal piston (not shown) is provided in the pneumatic cylinder 57 and has a piston rod 59 secured thereto. A clamping plate 61 is secured to the piston rod at a location thereon spaced from the abutment plate 58. The piston rod 59 is adapted to move the clamping plate 61 in a reciprocal manner toward and away from the abutment plate 58. If desired, a block 62 can be secured to the piston rod 59 on the opposite side of the pneumatic cylinder housing 57 from the clamping plate 61. Thus, reciprocation of the piston rod 59 will also effect a movement of the block 62 toward and away from the pneumatic cylinder housing 57. A sensor can be provided in the space 63 between the block 62 and the pneumatic cylinder housing 57 to sense the close position of the block 62 to the pneumatic cylinder housing and indicate to a control mechanism the location thereof. More specifically, when the clamping plate 61 is moved to the right from the position illustrated in FIG. 3, the block 62 will be moved to a position closely adjacent the pneumatic cylinder housing 57. The sensor provided in the space 63 would detect the immediate presence of the block 62 to the pneumatic cylinder housing 57 and provide a signal indicating the position of the clamping plate 61. This will become important when a workpiece W is placed on the supporting surface 46 of the movable table mechanism 37 with one corner 64 thereof brought into engagement with the abutment plate 58 and with the clamping plate 61 shifted rightwardly from the position illustrated in FIG. 3. Activation of the pneumatic cylinder to effect a shifting of the piston therein to the left will bring the clamping plate 61 into engagement with the right edge 66 of the workpiece W to virtually clamp the workpiece W between the abutment plate 58 and the clamping plate 61 as shown in FIG. 3. In this particular embodiment, the workpiece W is identical to the coil construction 10 illustrated in FIG. 1. The metal detecting sensor 48 will detect the presence of the workpiece W in the position illustrated in FIG. 3.

Figure 1:
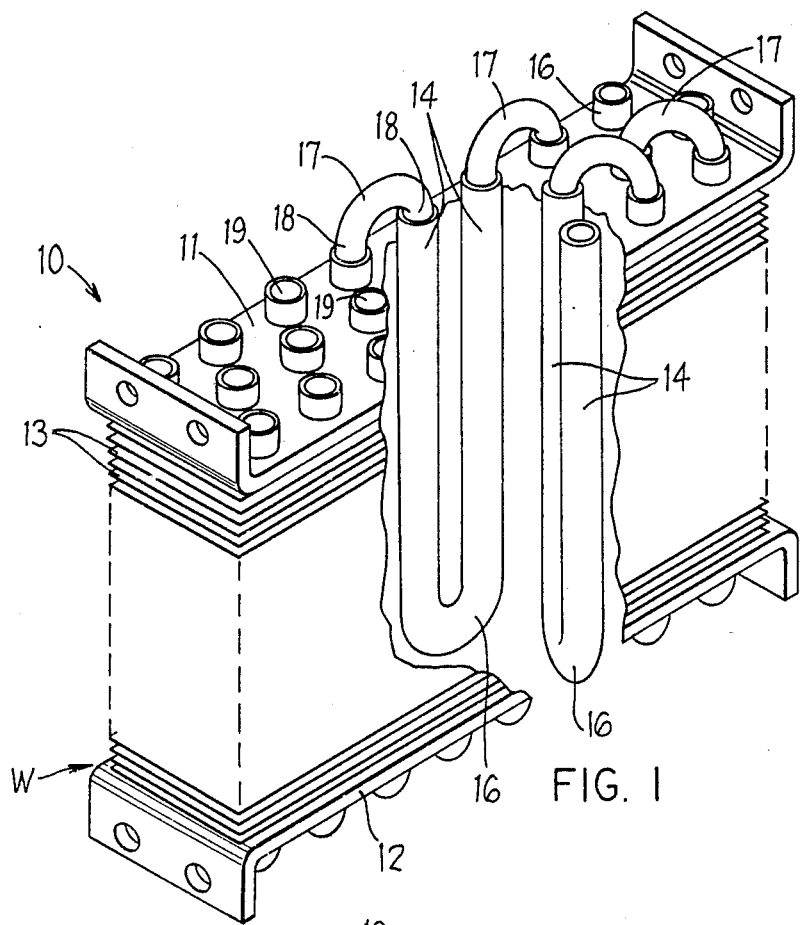
FIG. 1 is a perspective view of a partially assembled conventional coil construction.
Figure 2:
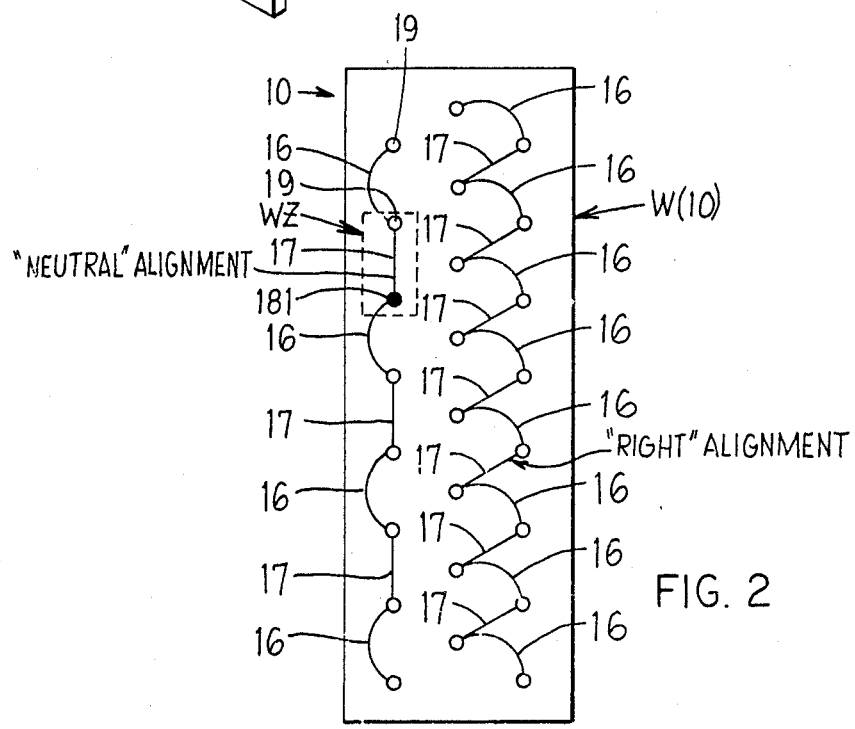
FIG. 2 is a schematic representation of a pattern of return bends assembled to a conventional coil construction.
Figure 4:
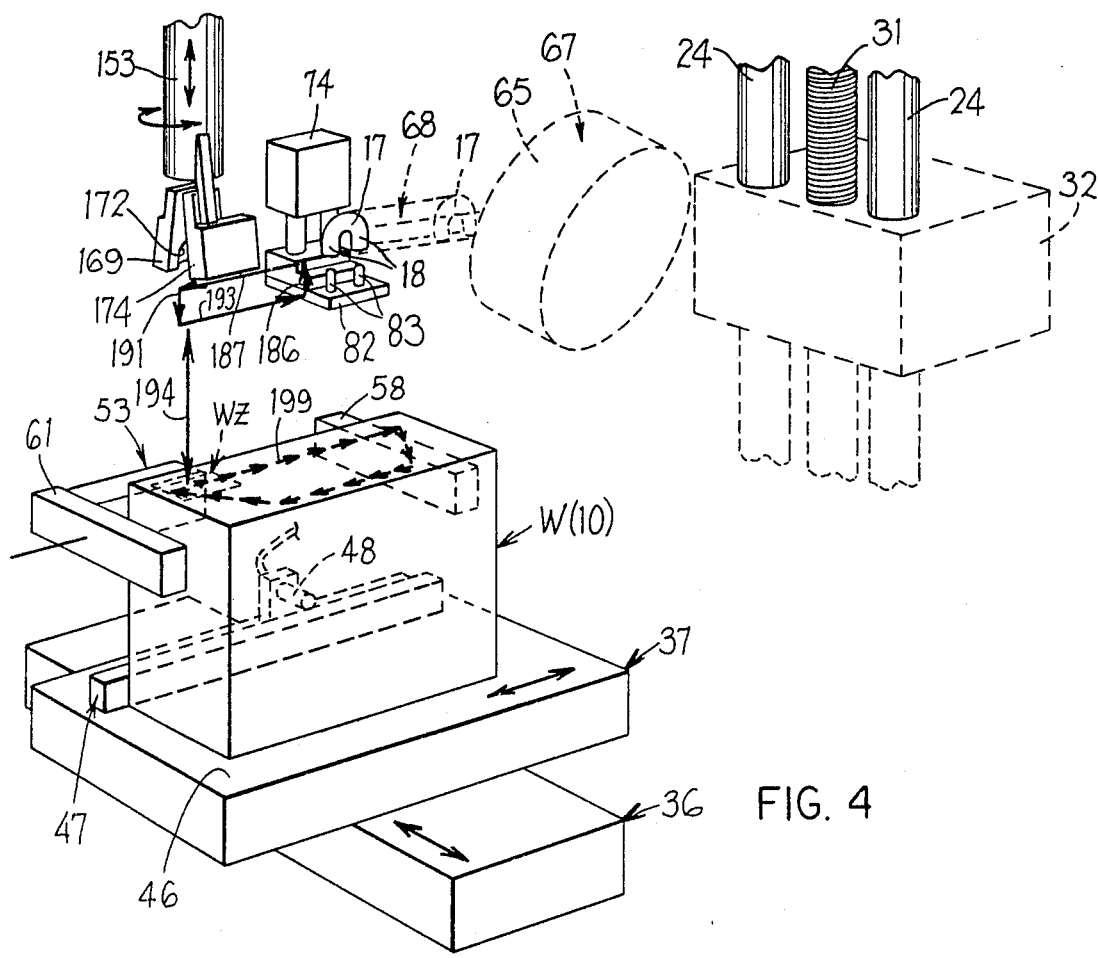
FIG. 4 is a perspective schematic illustration of the assembly device embodying the invention.

As has been described hereinabove with respect to the coil structure illustrated in FIG. 1, return bends 17 are to be inserted into the open ends 19 of the hairpin tubes 16. Each pair of open ends into which the end segments of a return bend 17 is to be inserted constitutes a working zone. For reference hereinbelow, the working zone will be identified by the reference character WZ and reference thereto is schematically illustrated in FIGS. 2 and 4. The position of the working zone WZ remains unchanged relative to the frame 22. Thus, while it may appear that the working zone WZ is in a different location relative to the workpiece W(10), it is in actuality in the same location relative to the frame and that the workpiece W(10) has been shifted due to operation of the worktable mechanisms 36 and 37 to cause it to appear oriented differently in FIG. 4 as compared to FIG. 2.

Figure 12:
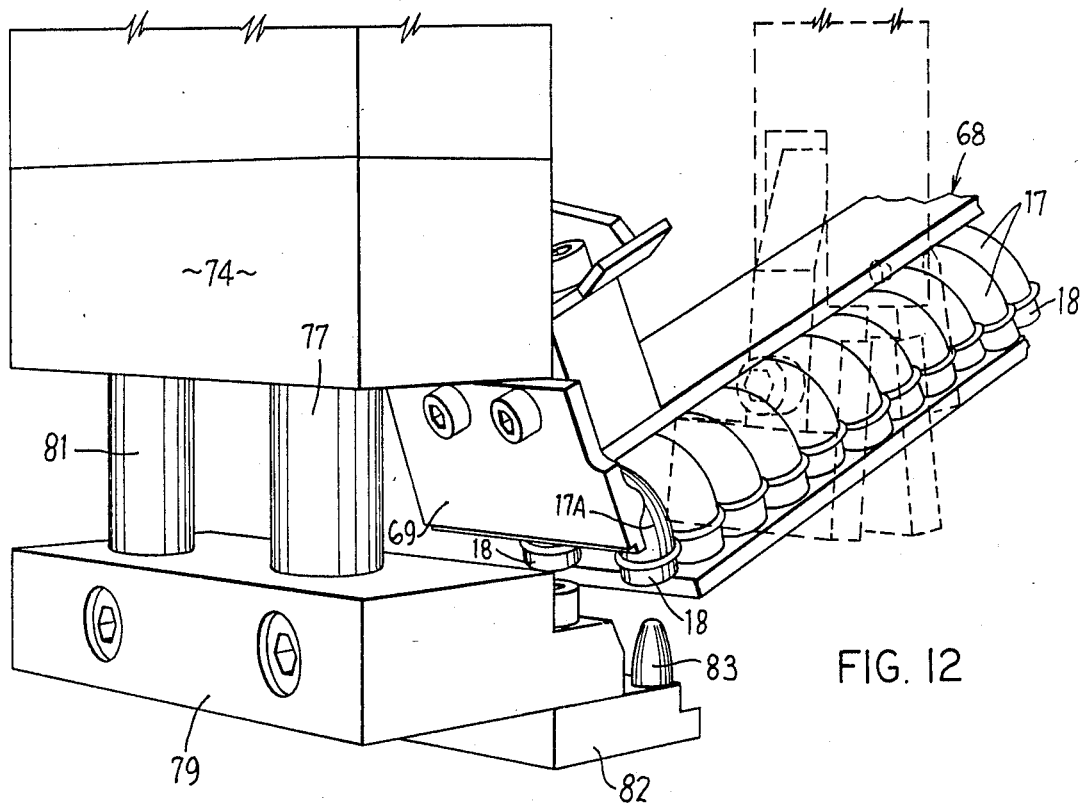
FIG. 12 is an enlarged perspective view of the bend carrier in a first position thereof.
Figure 13:
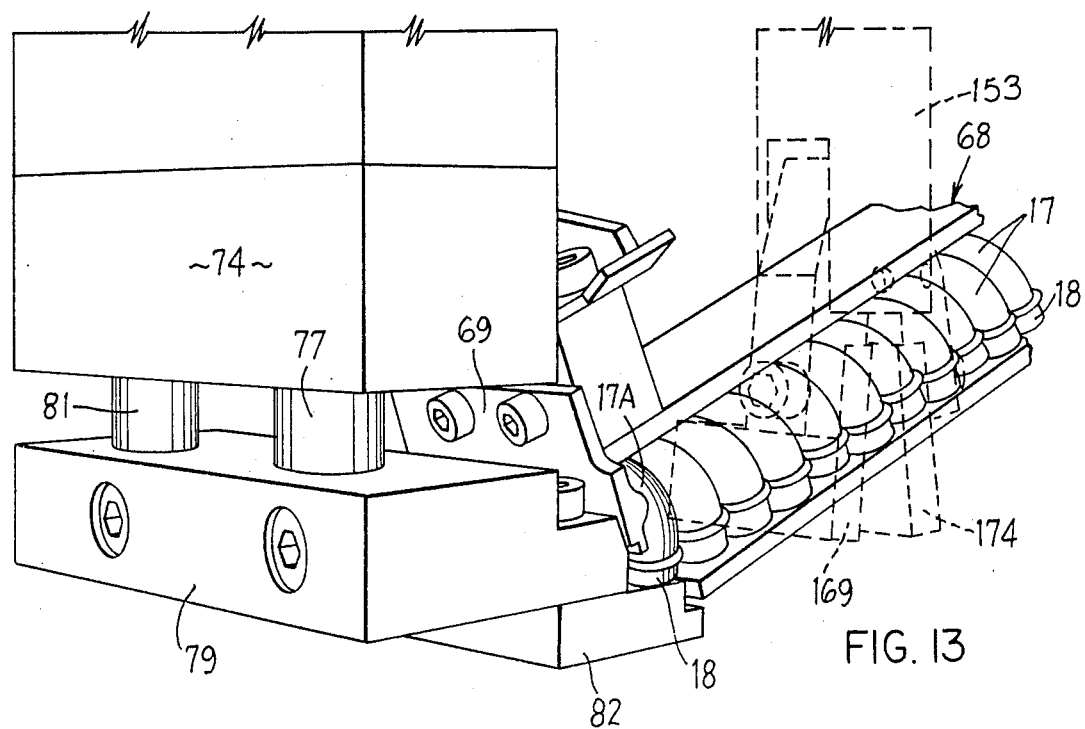
FIG. 13 is an enlarged perspective view of the bend carrier in a second position thereof.

A return bend supply mechanism 67 is secured to the carriage 32 vertically movable on the post members 24 by structure not illustrated. The supply mechanism 67 includes a hopper 65 and a vibratory return bend orientation structure 68 so as to cause the return bends to exit the hopper in a specifically oriented manner (FIGS. 4, 12 and 13). In this particular embodiment, the return bends 17 are oriented so that the U-shape is inverted and the end segments 18 thereof extend downwardly. An end wall 69 is secured to the end of the orientation structure 68 (FIGS. 12 and 13). The end wall 69 holds the endmost return bend 17A in a position wherein the downwardly opening end segments 18 are exposed.

A pneumatic cylinder housing 71 is secured to the carriage 32 and has a reciprocal piston (not shown) therein reciprocal in a horizontal plane extending perpendicular to the plane defined by the post members 24. A piston rod 72 is secured to the reciprocal piston and has a block 73 secured thereto at one end and a further pneumatic cylinder housing 74 secured thereto at the other end. In this particular embodiment, a guide rod 76 is secured to both the block 73 and the pneumatic cylinder housing 74 and is guided in an appropriate guideway in the pneumatic cylinder housing 71. The guide rod 76 extends parallel to the piston rod 72. A sensor (not illustrated) can be provided in the space between the block 73 and the pneumatic cylinder housing 71 to indicate to a control mechanism the location thereof. The pneumatic cylinder housing 74 has a reciprocal piston (not shown) therein reciprocal in a vertical direction perpendicular to the direction of movement of the piston rod 72. A piston rod 77 is secured to the reciprocal piston and has a block 78 secured at the upper end thereof and a further block 79 secured thereto at the lower end thereof. A guide rod 81 is secured to each of the blocks 78 and 79 and extends parallel to the piston rod 73 through an appropriate guideway in the pneumatic cylinder housing 74. A sensor (not illustrated) can be provided in the space between the block 79 and the pneumatic cylinder housing 74 to indicate to a control mechanism the location thereof. A bend carrier 82 is secured to the block 79. The bend carrier 82 has a pair of upstanding pegs 83 thereon vertically aligned with the downwardly open ends of the end segments 18 of the return bend 17A oriented adjacent the end wall 69 of the track 68. Thus, a vertical upward movement of the block 79 caused by a movement of the piston in the pneumatic cylinder housing 74 will bring the upstanding pegs 83 upwardly and inside the downwardly opening ends of the end segments 18 of the return bend 17A as shown in FIG. 13. Further discussion of the interrelationship between the movements of the pistons in the pneumatic cylinder housing 71 and 74 will be set forth in more detail below.

A support bracket 86 having a pair of parallel posts 87 thereon is secured to the carriage 32. The posts 87 extend parallel to each other and horizontally away from the bracket 86 in a direction parallel to the piston rod 72 and guide rod 76. A pneumatic cylinder housing 88 is secured to the posts 87 at the ends thereof remote from the bracket 86. A piston 89 (FIG. 5) is reciprocally housed in a chamber 91 in the pneumatic cylinder housing 88. The piston 89 is reciprocal in a direction perpendicular to a horizontal plane and has a piston rod 92 extending upwardly therefrom and a further piston rod 93 extending downwardly therefrom. In this particular embodiment, both piston rods 92 and 93 are axially aligned and each have a central opening 94, 96, respectively, extending therethrough and axially aligned with each other. Further, the piston 89 has an opening 97 extending therethrough axially aligned with the openings 94 and 96 in the piston rods 92 and 93, respectively. A housing 98 is secured to the upper end of the piston rod 92. The housing 98 has a chamber 99 (FIG. 5A) therein into which opens the central hollow part of the piston rod 92. The end of the housing 98 remote from the piston rod 92 has a pneumatic cylinder housing 101 secured thereto. The pneumatic cylinder housing 101 has a piston chamber 102 therein. An opening 103 in the housing 98 extends between the chamber 99 and the piston chamber 102. In this particular embodiment, the opening 103 is coaxial with the central opening 94 in the piston rod 92 and the pneumatic cylinder housing 101. A reciprocal piston 104 is mounted in the piston chamber 102 and a piston rod 106 is fastened thereto. The piston rod 106 extends through the opening 103 into the chamber 99 of the housing 98. The inner race of a roller bearing assembly 107 is fastened to the end of the piston rod 106 remote from the piston 104. The outer race of the roller bearing assembly 107 is secured to a coupler member 108. An elongated rod 109 is secured to the coupler member 108 and extends through the central openings 94, 96 and 97. The structure that operatively cooperates with the other end of the elongated rod 109 will be explained in detail below. Suffice it to say that a reciprocation of the piston 104 will effect a simultaneous reciprocation of the elongated rod 109 through the coupling member 108. Further, the roller bearing assembly 107 in the coupler member 108 will permit a relative rotation between the elongated rod 109 and the piston rod 106.

Figure 6:
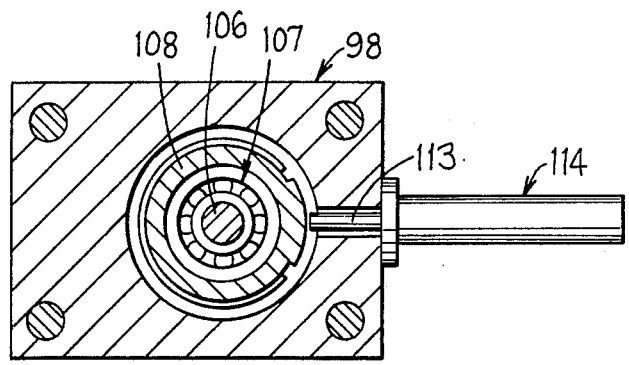
FIG. 6 is a sectional view taken along the line VI—VI of FIG. 5.
Figure 7:
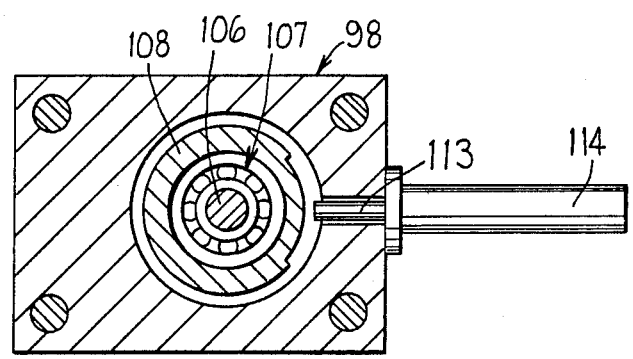
FIG. 7 is a sectional view taken along the line VII—VII of FIG. 5.
Figure 8:
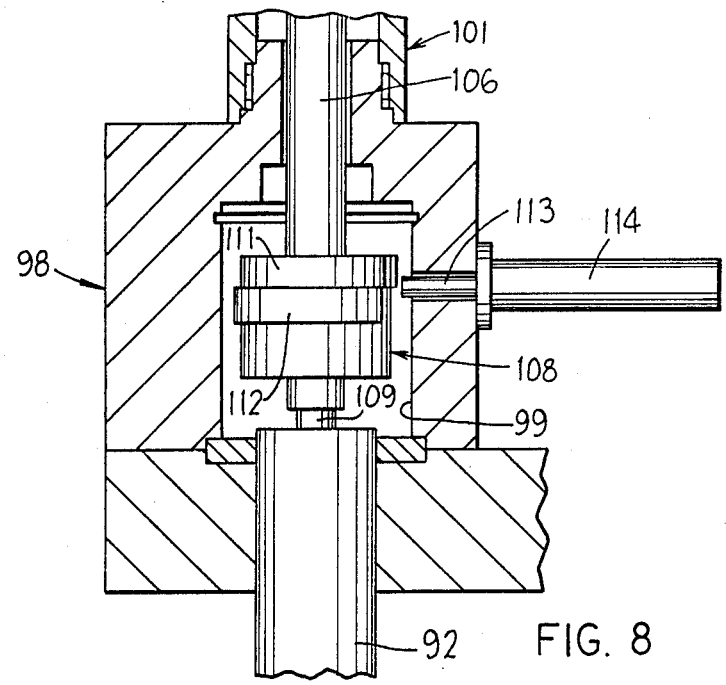
FIG. 8 is a sectional view taken along the line VIII—VIII of FIG. 5.

A pair of vertically offset and radially outwardly projecting ribs 111 and 112 are provided on the exterior of the coupler member 108 with the peripheries thereof located in close proximity to a probe 113 on a sensor 114 secured to the housing 98 (FIGS. 6 to 8). The purpose of the ribs 111 and 112 and their operative relationship to the probe 113 on the sensor 114 will be set forth below.

Figure 5:
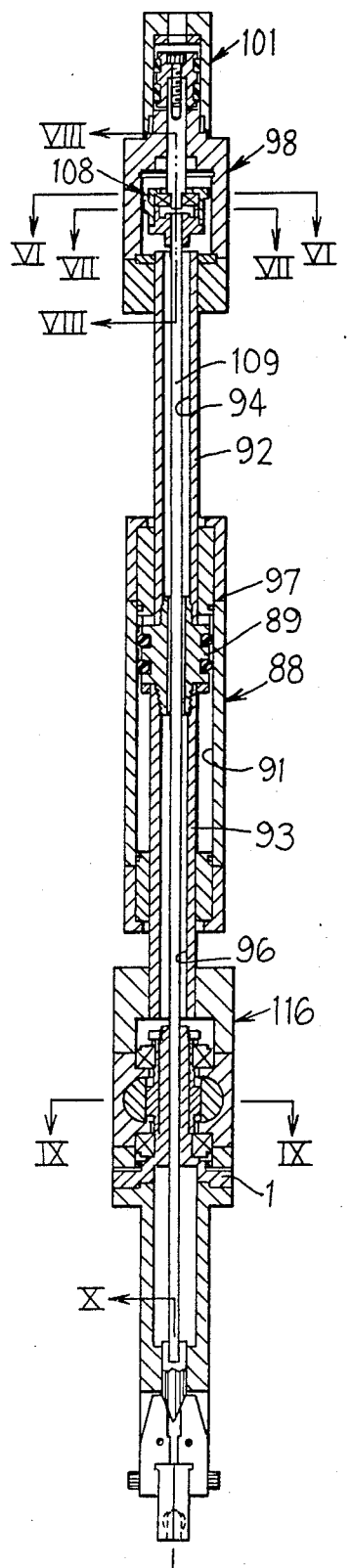
FIG. 5 is a sectional view taken along the line V—V of FIG. 3.
Figure 5B:
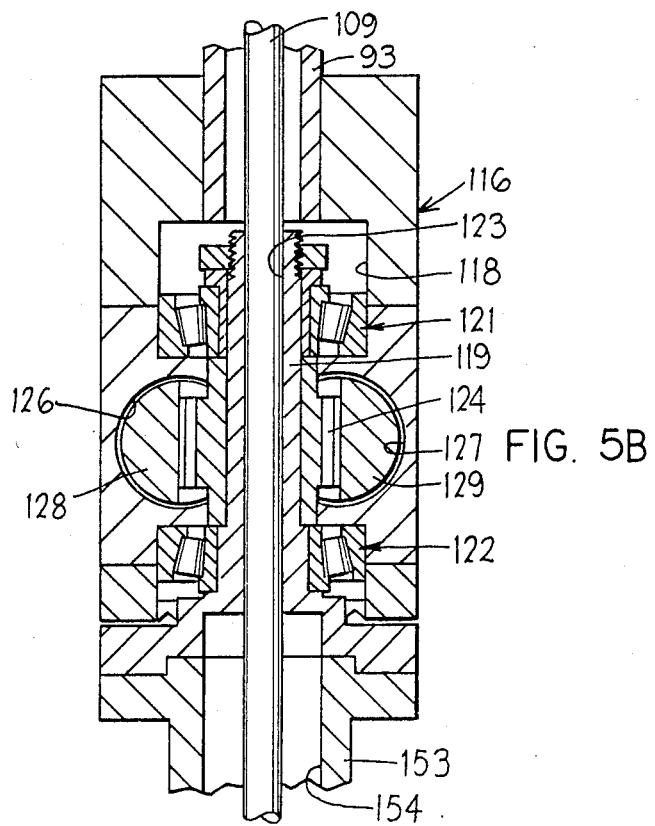
FIG. 5B is an enlarged fragment of FIG. 5.
Figure 9:
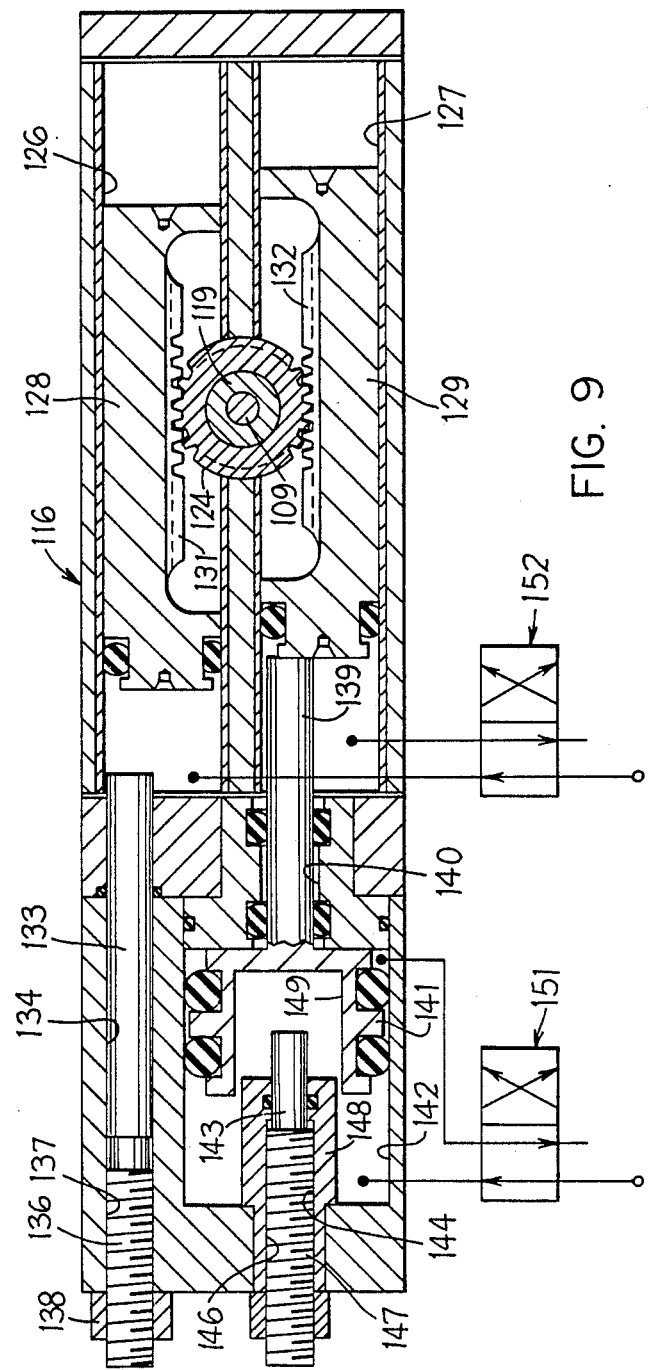
FIG. 9 is a sectional view taken along the line IX—IX of FIG. 5.

A gearing housing 116 is secured to the lower end of the piston rod 93 (FIGS. 5, 5B and 9). Further, a guide rod 117 is secured to and extends between the housing 98 and the gear housing 116 and extends parallel to the piston rods 92 and 93 through an appropriate guide opening in the pneumatic cylinder housing 98. The gear housing 116 has a central chamber 118 therein in which is housed a shaft 119 rotatably supported in the central chamber 118 by axially spaced roller bearing assemblies 121 and 122. The shaft 119 has a central opening 123 therethrough slidably receiving the elongated rod 109 therein. The axle 119 has a pinion gear 124 formed on the periphery thereof intermediate its ends. It is, of course, to be recognized that a separate pinion gear could be slidably telescoped onto the axle 119 and appropriately keyed against relative rotation rather than being formed on the periphery of the axle 119 as illustrated in FIG. 5B. The gear housing 116 has a pair of cylindrical and parallel chambers 126 and 127 therein (FIG. 9), the longitudinal axes of which lie coplanar in a horizontal plane extending perpendicular to the longitudinal axis of the shaft 119 and the elongated rod 109 extending therethrough. A reciprocal piston 128 is reciprocally mounted in the cylinder chamber 126 and a reciprocal piston 129 is reciprocally mounted in the cylindrical chamber 127. As shown in FIG. 9, both pistons 128 and 129 each have a gear rack formed thereon, the piston 128 having the gear rack 131 formed thereon while the piston 129 has the gear rack 132 formed thereon. The teeth of the gear racks 131 and 132 are meshingly engaged with the teeth on the pinion gear 124. Thus, and referring to FIG. 9, a leftward movement of the piston 128 will cause a clockwise rotation of the pinion gear 124 and a simultaneous leftward movement of the piston 129. A reverse movement of the respective pistons 128 and 129 will cause a counterclockwise rotation of the gear 124. The movement of the piston 128 to the left in FIG. 9 is limited by the position of a pin 133 oriented in an opening 134 in the housing 116. The pin 133 has an externally threaded segment 136 thereon threadedly coupled to an internally threaded portion 137 in the opening 134 to facilitate an axial adjustment of the position of the pin 133 in the opening 134. The position of the pin 133 can be fixed by providing a nut 138 threadedly engaged with the externally threaded segment 136 of the pin 133 that is external to the opening 134.

Similarly, the leftward movement of the piston 129 is limited by the positioning of a pin 139 reciprocally mounted in an opening 140 in the housing 116. In this particular embodiment, the pin 139 has a reciprocal piston 141 provided on an end thereof that is remote from the cylindrical chamber 127, which piston is reciprocally mounted in a further and coaxial cylindrical chamber 142 provided in the housing 116. The stroke of the piston 141 is limited by the position of a pin 143 reciprocally received in an opening 144 in a cylindrical insert 148 secured to the housing 116. The opening 144 has an internally threaded segment 146 therein which is threadedly engaged with an externally threaded segment on the pin 147. The insert 148 extends into a cylindrical recess 149 provided in the piston 141, which recess 149 is coaxial with the pin portion 139 extending axially from the piston 141 on a side thereof remote from the recess 149.

A pair of two-position valves 151 and 152 are provided. The two-position valve 152 effects a reciprocation of the pistons 128 and 129 whereas the two-position valve 151 controls the extent to which the pistons 128 and 129 are to be moved in the cylindrical chambers 126 and 127, respectively. The specific manner in which the two-position valves 151 and 152 cooperate with one another will be set forth in detail below.

Figure 10:
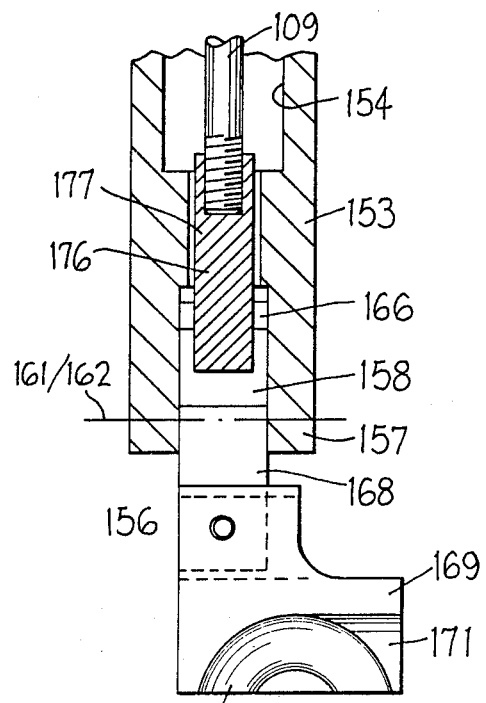
FIG. 10 is a sectional view taken along the line X—X of FIG. 5.

A cylindrical support member 153 (FIG. 5B) is fixedly secured to the end of the shaft 119 on an end thereof remote from the piston rod 93. The support member 153 has a central opening 154 therein receiving the elongated rod 109 therein. The lower end of the support 153 is bifurcated to define a pair of parallel legs 156 and 157 (FIG. 10). A pair of two-arm levers 158 and 159 are pivotally supported between the legs 156 and 157 by pins 161 and 162, respectively, which extend between and are connected to each of the legs 156 and 157. In this particular embodiment, the two arms on each lever extend away from opposite sides of the respective pivot pin 161 and 162. The uppermost arms 163 and 164 on the levers 158 and 159, respectively, extend side-by-side and have opposing chamfered surfaces 166 and 167 (FIG. 5A), respectively, adjacent the upper ends thereof. The chamfered surfaces 166 and 167 converge towards each other in a direction from the upper ends of the arms 163 and 164 toward the pivot pins 161 and 162, respectively. The arm 168 of the lever 158 has a return bend clamp member 169 fixedly secured thereto. The clamp member 169 has a first channel 171 therein and a further channel 172 having a shape corresponding to the U-shaped form of a return bend. The arm 173 of the lever 159 has a return bend clamp member 174 fixedly secured thereto. The clamp member 174 also has first and second channels therein corresponding to the channels 171 and 172 in the clamp member 169. A mechanism, not illustrated, is provided to normally urge the return bend clamp members 169 and 174 away from each other about the axes of the pivot pins 161 and 162. A wedge 176 is secured to the lowermost end of the elongated rod 109 and is reciprocally guided in a guide opening 177 located just above the bifurcation defining the parallel legs 156 and 157. The wedge 176 has a pair of oppositely sloped surfaces 178 and 179 thereon operatively engageable with the chamfered surfaces 166 and 167, respectively, to effect a pivoting of the levers 158 and 159 about the axes of the pivot pins 161 and 162 to bring the return bend clamp members 169 and 174 into engagement therewith. The purpose of this operation will be explained in more detail below.

The longitudinal axis of the elongated support member 153 intersects the working zone WZ (FIG. 2) preferably at 181. The location of the working zone WZ always remains fixed and the movable table mechanisms 36 and 37, when moved in combination, orient the workpiece W(10) relative to the work zone WZ.

OPERATION

Although the operation of the device embodying the invention has been indicated somewhat above, the operation will be described in detail hereinbelow to assure a more complete understanding of the invention.

Figure 11:
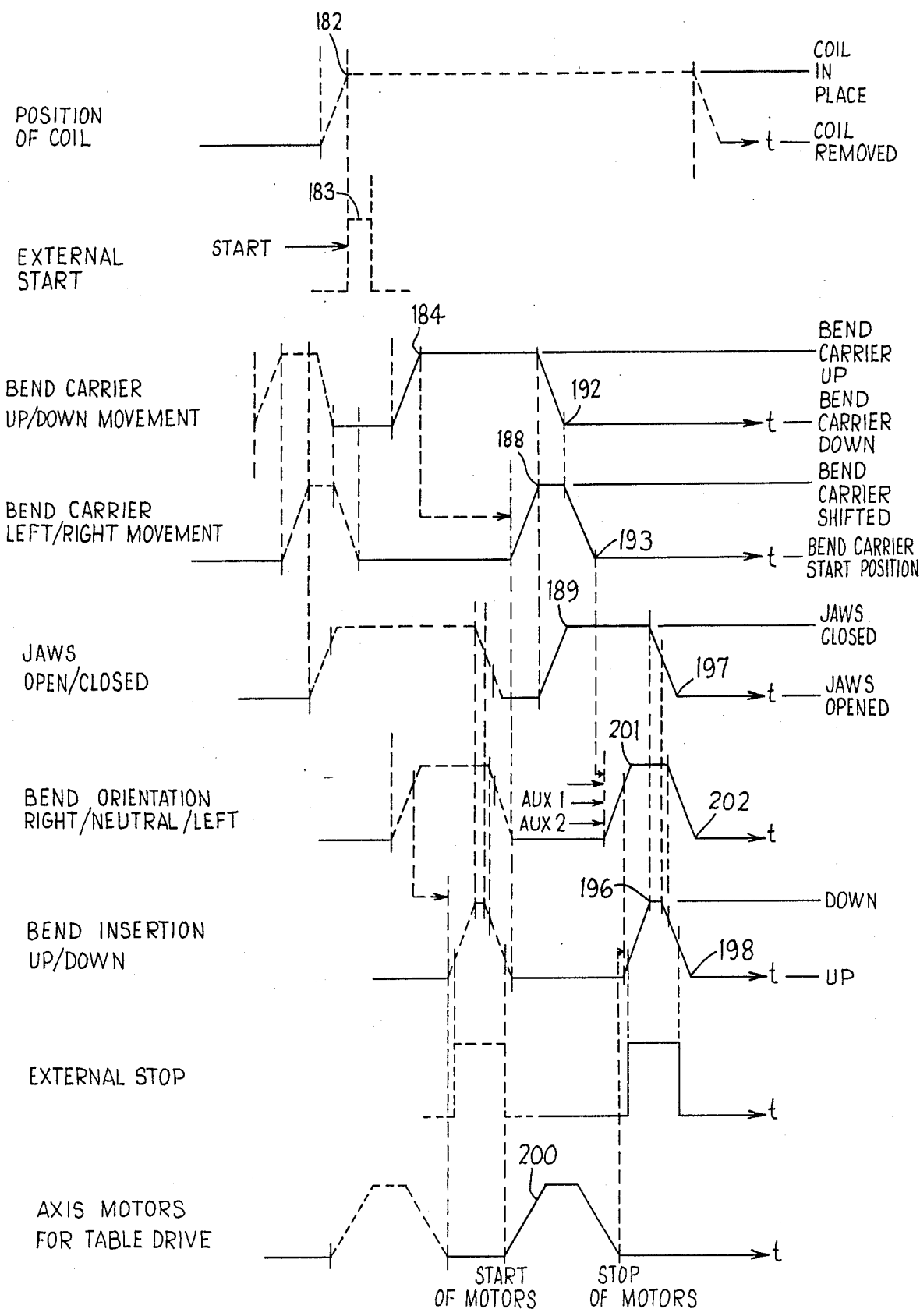
FIG. 11 is a diagram of sequential operations for the assembly device.

During the initial set up, the carriage 32 is elevationally adjusted to orient the pneumatic cylinder housings 71 and 74 as well as the bend carrier 82 and the return bend clamps 169 and 174 at a desired location above a certain size of workpiece. Once established, an operator first positions a workpiece W(10) on the workpiece supporting surface 46 to bring the workpiece in close proximity to the metal detecting sensor 48. The operator will position one edge 64 of the workpiece W against the abutment plate 58 to properly orient the workpiece on the workpiece supporting surface 46. As illustrated in FIG. 11, an appropriate placing of the coil on the workpiece supporting surface 46 will cause the metal detecting sensor 48 to issue a signal as at 182 indicating that the workpiece or coil W(10) is in place. Thereafter, the operator can initiate the start as illustrated at 183 in FIG. 11 by closing, with both hands, a pair of switches (not shown). The first movement that occurs is a movement of the bend carrier 82 from the position illustrated in FIG. 12 upwardly to the position illustrated in FIG. 13. Referring to FIG. 11, a movement of the bend carrier upwardly will cause the pegs 83 thereon to enter the downwardly openings in the end segments 18 of the return bend 17A is indicated at 184 in FIG. 11. This movement also is indicated by the vector arrow 186 in FIG. 4. The next movement that will occur is a shifting of the bend carrier 82 laterally of the supply track 68, namely, from the position illustrated in FIG. 13 to a position located to the right to remove a return bend 17A from the track 68 and promptly insert same between the opened and separated return bend clamps 169 and 174 shown in broken lines in FIG. 13. This lateral shifting movement of the bend carrier 82 is represented by the vector arrow 187 in FIG. 4 and is indicated at 188 in FIG. 11. This lateral shifting movement of the return bend carrier 82 is effected by a shifting of the piston in the pneumatic cylinder housing 71 illustrated in FIG. 3. If the workpiece is oriented as shown in FIG. 2, there will be no movement effected by the movable table mechanisms 36 and 37. That is, the workpiece will remain so that the work zone WZ is oriented in accordance with the position illustrated in broken lines in FIG. 2. The next movement that occurs is a closing of the return bend clamps 169 and 174 to the position illustrated in solid lines in FIG. 5A. This occurs at 189 in the diagram of FIG. 11. This movement is effected by a downward movement of the piston 104 in the pneumatic cylinder housing 101 which effects a downward movement of the elongated rod 109 to move the wedge member 176 between the arms 163 and 164 of the levers 158 and 159, respectively. The wedge member 176 will effect a separation of the arms 163 and 164 to bring the arms 168 and 173 as well as the return bend clamps 169 and 174 together as illustrated in solid lines in FIG. 5A. Simultaneous with the foregoing, the bend carrier 82 is shifted downwardly away from the now closed return bend clamps 169 and 174 as represented by the vector arrow 191 illustrated in FIG. 4. This shifting movement corresponds to an orientation of the bend carrier at 192 illustrated in FIG. 11. The next movement that will occur is a shifting of the bend carrier 82 back to its initial position as represented by the vector arrow 193 in FIG. 4. This corresponds to an orientation of the bend carrier at position 193 illustrated in FIG. 11.

If the first return bend that is to be inserted into the end segment receiving structure on the workpiece is oriented in the working zone as illustrated in FIG. 2, the clamps 169 and 174 will already be in what is hereinafter referred to as the neutral position. Thus, the next movement that will occur will be a downward movement in direction of the vector 194 illustrated in FIG. 4 to move the clamps 169 and 174 to the working zone to effect an insertion of the end segments 18 on the return bend into the end segment receiving openings on adjacent hairpin tubes 16. A location of the clamps 169 and 174 at the working zone corresponds to the orientation depicted by the reference numeral 196 in FIG. 11. Thus, the next movement that will occur will be an upward shifting of the piston 104 in the pneumatic cylinder housing 101 to retract the wedge member 176 from between the arms 163 and 164. The biassing structure (not illustrated) will effect a movement of the clamps 169 and 174 away from each other to the broken line position illustrated in FIG. 5A. This position of the clamps 169 and 174 is represented by the reference numeral 197 in FIG. 11. Following an opening of the clamps 169 and 174, the piston 89 in the pneumatic cylinder housing 88 is shifted back to its initial position, namely, upwardly in accordance with the vector 194 illustrated in FIG. 4 to bring the clamps 169 and 174 back to their initial position. This position corresponds to the reference 198 illustrated in FIG. 11. The aforementioned operation will have effected an insertion of a return bend 17 in the working zone WZ as represented by the schematic illustration in FIG. 2.

The next cycle of operation will be essentially the same as the aforementioned cycle of operation except that following a shifting of the bend carrier 82 upwardly into engagement with a return bend on the track 68 (namely to the FIG. 13 position), the movable table mechanism 37 will be moved by an operation of the electric motor 44 (FIG. 3) to shift the workpiece W(10) in the direction of the arrows 199 illustrated in FIG. 4. An energization of the motor 41 is schematically represented by the reference character 200 illustrated in FIG. 11. This table movement will bring the next pair of hairpin tubes that are to be joined together by a return bend into the working zone WZ. Eventually, the movable table mechanism 37 will have effected a shifting of the workpiece W(10) so that the working zone WZ is oriented at the location on the workpiece W(10) as shown in FIG. 4. This will have effected an insertion of a return bend in the lefthand row of hairpin tubes 16 illustrated in FIG. 2. The next series of operations will effect an insertion of return bends in the righthand row illustrated in FIG. 2. In order to accomplish this, both movable table mechanisms 36 and 37 must be moved simultaneously to orient the righthand row of hairpin tubes 16 in alignment with the working zone WZ. Thus, during a continued cyclic operation of the assembling device 21, much of the cyclic operation described above is repeated except that after the clamps 169 and 174 have been closed and the return bend carrier has been shifted downwardly out of engagement with the return bend now held by the closed clamps 169 and 174 and shifted back to the initial position thereof, the clamps 169 and 174 are now shifted from the "neutral" position to the "right" position so that the end segments 18 of a bend carrier 17 will be vertically aligned with the appropriate end segment receiving openings on adjacent hairpin tubes oriented along the right side of the workpiece W(10) illustrated in FIG. 10. This position change will be detected by the change in relative positions of the rims 111 and 112 (FIG. 8) to the probe 113 on the sensor 114. Thus, the two-position valve 151 will be shifted to the left to cause a retraction of the piston 141 to the left to withdraw the pin 139 from the cylindrical chamber 127. Simultaneously therewith, the two-position valve 152 will remain unchanged and air pressure will be supplied to the left end of the piston 128 to urge it rightwardly. This will cause a clockwise rotation of the gear 124 and a corresponding leftward movement of the piston 129. A clockwise movement of the gear 124 will effect a rotation of the shaft 119 and the support member 153 to effect the proper orientation of the clamps 169 and 174 prior to a downward movement thereof into the working zone. This bend orientation will occur at 201 in FIG. 11. Following a downward movement of the clamps into the work zone to effect an insertion of the end segments 18 on a return bend into the end segment receiving openings on adjacent hairpin tubes, the clamps 169 and 174 will open as at 197 in FIG. 11 followed by a return of the clamps to the "neutral" orientation thereof as at 202 in FIG. 11. In order to effect a return of the clamps 169 and 174 to the neutral position, the two-position valve 151 will need to be shifted back to the right again so that air pressure will be applied to the left side of the piston 141 to urge the pin 139 into the cylindrical chamber 127 and push the piston 129 to the right. In order for this to occur, the two-position valve 152 will need to be shifted to the left to permit an appropriate exhausting of the left end of the cylindrical chamber 126 to facilitate the leftward movement of the piston 128.

It is submitted that an appropriate control mechanism and associated circuitry of conventional design can be utilized in effecting the aforementioned controlled operations without their necessitating a disclosure of a specific circuit for doing so. It is submitted that the flow chart of FIG. 11 is sufficient and those skilled in this art will clearly be able to construct an appropriate control circuit to effect the operations described hereinabove.

In some coil constructions, the spacings between one set of mutually adjacent set of legs of U-shaped hairpins requires a return bend having a certain radius of bend whereas the spacings between another and separate set of mutually adjacent set of legs of U-shaped hairpins requires a return bend having a different radius of bend. To accommodate two different sizes of return bends, it is within the scope of this invention to provide a further and not illustrated return bend supply secured to the carriage 32, which supply includes a hopper and a vibratory return bend orientation structure so as to cause the return bends to exit the hopper in a specifically oriented manner. A further bend carrier will, in this instance, also be provided to deliver the different sized return bends to the clamps 169 and 174. In this particular embodiment, the clamps 169 and 174 will each be modified slightly to enable an accommodating of different sizes of return bends. Appropriate control circuitry will be employed to coordinate the bend carrier operation with the movable table mechanisms 36 and 37 to assure the delivery of a correctly sized return bend to the clamps 169 and 174.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An assembly device for assembling a member having plural and spaced end segments with parallel axes thereon to a workpiece having plural and spaced sets of end segment receiving means with parallel axes thereon, a spacing between said axes of said end segment receiving means in each set corresponding to the spacing of said axes of said end segments from each other, comprising:

frame means;
workpiece support means mounted on said frame means for supporting said workpiece, said workpiece support means being movable in a plane to bring each set of end segment receiving means into a working zone;
member supply means mounted on said frame means;
member transport means for transporting a member from said member supply means to a workpiece mounted on said workpiece support means, said member transport means including the following:
member gripping means for gripping and holding said member in an initial first oriented position relative to a workpiece mounted on said workpiece support means and relative to said plural and spaced end segment receiving means on said workpiece;
first drive means for orienting said member gripping means about an axis of rotation perpendicular to said plane so that a selected one of the plural and spaced end segments of said member becomes aligned with a selected set of said plural and spaced end segment receiving means on said workpiece;
second drive means for effecting a movement of said member gripping means perpendicular to said plane between first and second positions corresponding to toward and away from, respectively, the workpiece on said workpiece support means, so that a movement of said member gripping means to said first position effects a delivery of said member to said working zone and a simultaneous insertion of said end segments thereon into said end segment receiving means;
release means for effecting a release of the holding relation between said member gripping means and said member in response to said member gripping means attaining said first position sequentially followed by a movement, caused by said second drive means, of said member gripping means away from said first position toward said second position without a member held therein, and by a reorientation, caused by said first drive means, of said member gripping means about said axis of rotation to said initial first oriented position thereof;
third drive means for effecting a movement of said workpiece support means to bring a set of open end segment receiving means into said working zone; and
carrier means for selecting a member from said member supply means and for shifting said member from said member supply means to said member gripping means, said carrier means including a carriage and support means for supporting said carriage for movement between said member supply means and said member gripping means, said carriage including orienting means for orienting said axes of said end segments into a predefined orientation parallel to said axes of end segment receiving means, and said support means including reciprocal drive means effecting said movement of said carriage between said member supply means and said member gripping means, said reciprocal drive means effecting a movement of said orienting means into engagement with said end segments as well as out of engagement with said end segments, said reciprocal drive means also effecting a lateral movement of said carriage away from said member supply means in response to said reciprocal drive means orienting said carriage and said orienting means toward and into engagement with said end segments, and a lateral movement toward said member supply means in response to said reciprocal drive means orienting said carriage and said orienting means away from and out of engagement with said end segments.

2. The assembly device according to claim 1, wherein said carriage includes a pair of protuberances thereon spaced the same distance apart as said spacing between said end segments; and wherein said reciprocal drive means includes first and second reciprocal drive means for effecting said movement of said carriage between said member supply means and said member transport means, said first reciprocal drive means effecting a movement of said protuberances toward and into engagement with said end segments as well as away from and out of engagement with said end segments, said second reciprocal drive means effecting a lateral movement away from said member supply means in response to said first reciprocal drive means orienting said carriage toward said end segments, and a lateral movement toward said member supply means in response to said first reciprocal drive means orienting said carriage away from said end segments.

3. The assembly device according to claim 1, wherein said member transport means further includes a subframe means mounted on said frame means, said second drive means being mounted on said subframe means;

wherein said second drive means includes a housing having a piston chamber therein, a reciprocal piston in said housing, a piston rod extending outwardly of said housing on at least one side thereof, said first drive means being mounted on said piston rod and being movable therewith; and a support member rotatably supported on said first drive means, said member gripping means being mounted at one end of said support member, said axis of rotation being that of said support member.

4. The assembly device according to claim 3, wherein said first drive means includes a further housing having spaced bearing means rotatably supporting said support member, said support member having a gear fixed thereto and oriented in a chamber in said further housing, said first drive means further including a laterally movable rack means engaged with said gear such that a lateral movement of said rack means will effect a rotary movement of said gear and, consequently, said support member and said member gripping means.

5. The assembly device according to claim 3, wherein said member gripping means includes a pair of two-arm lever jaws pivotally supported on said support member about parallel axes defining a further plane perpendicular to said axis of rotation, a reciprocal wedge member oriented between and engaging the mutually adjacent arm of each lever jaw whereby a movement of said wedge member axially of said support member and toward said jaws will effect a closing of said jaws, and a movement of said wedge member axially of said support member and away from said jaws will facilitate an opening of said jaws.

6. The assembly device according to claim 5, wherein said piston rod extends from a second side of said housing remote from said one side thereof and has a further housing mounted thereon, said piston rod being hollow and having an elongated rod extending therethrough and having said wedge member secured to one end thereof, said further housing having a piston chamber therein and a reciprocal piston in said piston chamber and connected to the other end of said elongated rod.

7. The assembly device according to claim 6, including detecting means for detecting a rotated position of said member gripping means away from said initial position thereof and the opened and closed condition of said jaws.

8. The assembly device according to claim 1, wherein said plural and spaced end segment receiving means in a first set on said workpiece mounted on said workpiece holder means are out of alignment with the plural and spaced end segments on said member.

9. The assembly device according to claim 1, wherein said workpiece is a heat transfer coil having plural U-shaped tubes, each U-shaped tube having parallel legs parallel with the legs of other U-shaped tubes, each of said legs terminating at a free end thereof in an open end segment receiving means, the free ends of said legs each being attached to an end plate on said coil, said end segment receiving means being oriented equidistantly from mutually adjacent ones of other of said end segment receiving means; and wherein said member is a U-shaped bend member having a pair of parallel legs, each of which terminates in a said end segment, the lateral spacing between said end segments corresponding to said equidistant spacing between said end segment receiving means, a sequential insertion of a U-shaped bend member in selected ones of said mutually adjacent end segment receiving means effecting a series connected array of said U-shaped tubes and said U-shaped bend members.

* * * * *